Jan. 21, 1941.　　　P. VAN CLEEF　　　2,229,316
TAPE
Filed July 24, 1937

Inventor:—
Paul Van Cleef
By Thed Gerlach his Atty

Patented Jan. 21, 1941

2,229,316

UNITED STATES PATENT OFFICE 2,229,316

TAPE

Paul Van Cleef, Chicago, Ill., assignor, by mesne assignments, to Van Cleef Bros., Chicago, Ill., a partnership composed of Noah Van Cleef, Felix Van Cleef, and Paul Van Cleef Application July 24, 1937, Serial No. 155,483

6 Claims. (Cl. 91—68)

The present invention relates generally to tape. More particularly the invention relates to that type of tape which is merchandised or sold in roll form, is adapted to be used for masking and other purposes, and comprises a long narrow base strip of flexible material having on one face thereof a coating of permanently tacky pressure sensitive rubber base adhesive and embodying on its other or outer face a vulcanized rubber protective coating whereby it is rendered impervious or resistant to paint, lacquer and other finishing materials, and also oils, organic solvents and water.

One object of the present invention is to provide a tape of this type which is sufficiently tough for its intended purpose and at the same time is capable of being stretched to a much greater extent than previously designed tapes of the same general character by reason of the fact that the base strip thereof is formed of porous long fibered nonhydrated fiber.

Another object of the invention is to provide a tape of the last mentioned character in which the base strip is saturated or impregnated with rubber latex so as to increase the stretchability of the tape as a whole and also provide means for effectively bonding or anchoring the vulcanized rubber protective coating as well as the coating of pressure sensitive rubber base adhesive to the base strip.

Another object of the invention is to provide a tape of the type and character under consideration in which the vulcanized rubber protective coating on the outer face of the base strip has a separator coat of ethyl cellulose for preventing the coating of pressure sensitive rubber base adhesive on the inner face of the base strip from becoming bonded to the vulcanized rubber protective coating when the tape is rolled upon itself.

A further object of the invention is to provide a tape which may be manufactured at a comparatively low cost and embodies certain characteristics and properties which are not found in previously manufactured tapes of the same general type and for the same purpose.

Other objects of the invention and the various advantages and characteristics of the present tape will be apparent from a consideration of the following detailed description.

The invention consists in the several novel features which are hereinafter set forth and are more particularly defined by claims at the conclusion hereof.

In the drawing which accompanies and forms a component part of this specification or disclosure and in which like numerals of reference denote corresponding parts throughout the several views.

Figure 1:
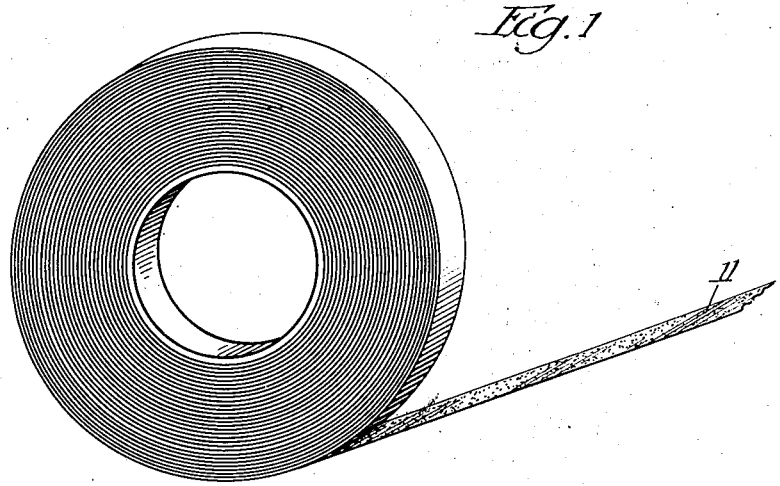
Figure 1 is a perspective of a roll of tape embodying the invention.
Figure 2:
Figure 2 is an enlarged longitudinal sectional view of the paper base strip before application of the protective coating and top or separator coat to its outer face and prior to being saturated with rubber latex and equipped with a coating of permanently tacky pressure sensitive rubber base adhesive.
Figure 3:
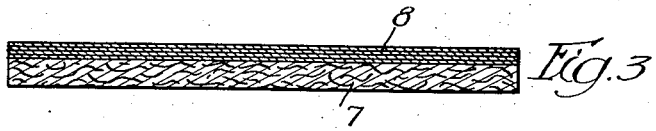
Figure 3 is an enlarged longitudinal sectional view showing the strip after application of the protective coating of rubber to its outer face.
Figure 4:
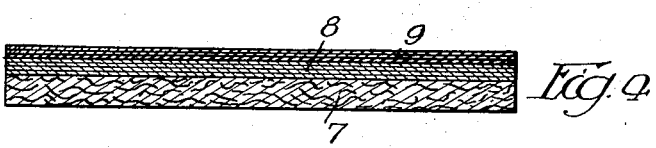
Figure 4 is an enlarged longitudinal sectional view showing the strip after the application of the coat of ethyl cellulose to the rubber protective coating and prior to being saturated with rubber latex.
Figure 5:
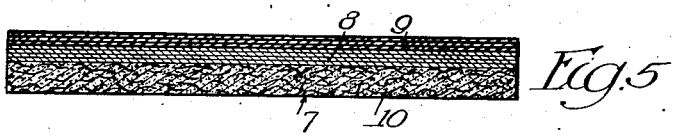
Figure 5 is an enlarged longitudinal sectional view showing the strip after application of the protective coating and the ethyl cellulose coat and also after saturation with rubber latex.
Figure 6:
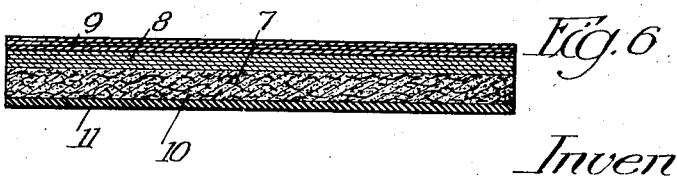
Figure 6 is an enlarged sectional view of the finished tape.

The tape which forms the subject matter of the invention is adapted primarily for masking purposes although it may be used in other capacities such, for example, as a wrapping or winding, or an ornamental strip. It is adapted to be merchandised or supplied in roll form, as shown in Figure 1, and consists of a long narrow base strip 7, a vulcanized rubber protective coating 8 on the outer face of the strip 7, a coat 9 of ethyl cellulose on the outer face of the protective coating, a rubber latex filling or impregnation 10 for the base strip, and a coating 11 of permanently tacky pressure sensitive rubber base adhesive on the inner face of the base strip.

The base strip 7 is formed of a porous long fibered paper consisting of uncrushed cylindrical soft nonhydrated fibers which are of substantially uniform length and are uniformly distributed to leave minute substantially uniformly spaced openings throughout the area of the paper. Such paper forms the subject matter of United States Letters Patent No. 2,045,096, granted June 23, 1936, to C. H. Dexter & Sons, Inc., Windsor Lock, Conn., U. S. A., as the assignee of Fay H. Osborne, and is manufactured by said corporation under the trade-name "Japodex." It is characterized by its marked flexibility, toughness, and stretchability. Preferably the "Japodex" type paper of which the base strip is formed is treated with viscose for strength increasing purposes and to bind the fibers firmly together, and has a weight of approximately 15 pounds per ream of 480 sheets 24" x 36". By forming the base strip 6 of the aforementioned paper, the tape as a whole has the necessary or desired toughness and flexibility and in addition will stretch to such an extent that when used for masking purposes it may be readily applied to a surface in a curved or arcuate manner. Instead of using or employing "Japodex" type material the base strip 7 may, if desired, be formed of "Dextilose" paper. The latter is manufactured by the aforesaid C. H. Dexter & Sons, Inc., and is the same as that exhibited in Letters Patent No. 2,045,096 except that the base contains 25% alpha cellulose. When the base strip 7 is made of "Dextilose" paper it is preferably made of paper having a weight of approximately 12½ pounds per ream of 480 sheets 24" x 36".

The protective coating 8 is applied to the base strip 7 before the coating 11 of pressure sensitive adhesive. It serves to strengthen the base strip and render it impervious or resistant to paint, lacquer and other finishing materials and also oils, organic solvents and water. The coating is applied by spreading on the outer face of the base strip a plurality of coats of a vulcanizable rubber composition which is dissolved in a suitable organic solvent such as naphtha, and is composed of the following ingredients in substantially the proportions specified:

| | Parts by weight |
|---|---|
| Rubber | 35.0 |
| Sulphur | .5 |
| Accelerator | .8 |
| Zinc oxide | 2.0 |
| Reinforcing pigment and fillers | 62.0 |

Preferably four coats of the aforementioned composition are used to form the protective coating 8 and these coats are applied successively and one on top of the other by way of a doctor knife on a spreading machine. After the application of each coat to the base strip 7 heat is applied by way of heated coils behind the doctor knife in order to dry the coat by evaporating or driving off the solvent. The sulphur in the composition serves as a vulcanizing agent whereby the coating 9 upon the application of heat, as hereinafter described, is vulcanized into adhering relation with the base strip.

The coat 9 extends over and completely covers the protective coating 8 and is applied before vulcanization of the rubber component of the latter. It is composite in character in that it is formed of three thin layers, and forms a smooth glossy finish or separator whereby the coating 11 of pressure sensitive rubber base adhesive is precluded from becoming bonded to the protective coating 8 when the tape is rolled upon itself. Each of the three layers is applied by way of a doctor knife on a spreading machine similarly to the coats which form the protective coating 8. The innermost layer is preferably formed by mixing together the following ingredients in substantially the proportions specified:

| Ethyl cellulose | pounds | 15 |
|---|---|---|
| Rubber stock or material like that used to form the protective coating 8 | pounds | 15 |
| Benzol | gallons | 15 |

After application of the innermost layer, heat is applied so as to disperse or evaporate the solvent that is, the benzol. The intermediate layer of the coat 9 is applied immediately after drying of the innermost coat. It is preferably formed of the following ingredients in substantially the proportions specified:

| Ethyl cellulose | pounds | 15 |
|---|---|---|
| Rubber stock or material which is used to form the coating 8 | pounds | 5 |
| Benzol | gallons | 15 |

After application of the intermediate layer the solvent is evaporated by way of heat. The third or outermost coat forming layer is applied after drying of the intermediate or second coat and preferably consists of the following ingredients in substantially the proportions specified:

| Ethyl cellulose | pounds | 20 |
|---|---|---|
| Benzol | gallons | 20 |
| Resin | pound | 1 |

After application of the outermost layer heat is applied so as to disperse the benzol and thus dry the layer. By having a comparatively large amount of rubber stock in the innermost layer and a small amount of rubber stock in the intermediate layer, the coat 9 is of such consistency or character that it readily unites or bonds itself to the outer coat of the protective coating 8 and there is substantially no likelihood of the coating 9 being stripped from the protective coating by adhesion to the pressure sensitive rubber base coating 11 when the tape is unwound. By having the outermost layer formed substantially entirely of ethyl cellulose the coating of pressure sensitive rubber base adhesive on the inner face of the paper strip 7 strips or pulls away readily when the tape is unwound and bonding of the coating 11 of pressure sensitive adhesive to the protective coating 8 is effectively eliminated. The innermost and intermediate layers of the coat 9 constitute anchor layers between the outer layer and the outer coat of the protective coating 8. A small amount of resin is used in the third or outermost coat in order effectively to bond such coat to the intermediate coat and prevent it from being torn or pulled away with the coating 11 when the tape is unrolled. As a resin, rosin, ester gum, paracoumarone or Burgundy pitch may be used. By forming the coat 9 of ethyl cellulose the coat is heat resistant, and is also free from discoloration by sunlight. In addition it is soluble in cheap or inexpensive solvents and eliminates tackiness as far as the top surface of the tape is concerned.

The rubber latex filling 10 serves to increase the stretchability of the base strip and also to bond the protective and adhesive coatings to the strip. It completely saturates or impregnates the base strip and is formed of the following ingredients in substantially the proportions specified:

| | Parts by weight |
|---|---|
| 60% ammoniated rubber latex | 100.0 |
| Sulphur | 1.0 |
| Zinc oxide | 2.0 |
| Antioxidant | 0.5 |
| Accelerator | 1.25 |
| Wetting agent | 0.5 |

The sulphur, zinc oxide, and antioxidant are preferably first ground in a pebble mill and are then stirred or mixed into commingling relation with the ammoniated rubber latex. The rubber latex is preferably reduced in concentration to 55%. The solution, that is, the liquid or aqueous rubber latex dispersion, is applied to the inner face of the base strip 7 in such manner that it completely saturates or impregnates all of the fibers of the strip and comes in contact with the inner coat of the protective coating 8. Preferably the liquid latex composition is applied by way of squeeze rolls so that it completely penetrates the strip and produces a bond between the outer face of the strip and the protective coating. After application of the composition in the aforementioned manner to the base strip, the strip with its protective coating 8 and coat 9 on one side and its filling of rubber latex composition is passed over steam coils or through a hot air chamber so as to dry the filling by dissipating the solvent for the latex, that is, the water part of the composition. Upon drying of the filling 10 there is a substantially permanent bond between the protective coating 8 and the base strip 7 and there is a rubber latex coating on all of the fibers of the strip. The liquid latex composition is preferably applied and dried directly after drying of the outer layer of the coat 9. After drying of the rubber latex filling 10, that is, after dissipation of the water, the base strip with its protective coating 8 and the ethyl cellulose coat 9 is placed in a heater or oven at a temperature of approximately 250° F. in order to vulcanize the rubber of the protective coating and also the rubber latex filling 10. The strip is left in the heater or oven for a sufficient period of time to effect complete vulcanization of the coating 8 and the filling. At the conclusion of the vulcanizing operation there is a substantially permanent bond between the rubber latex saturated or impregnated base strip and the protective coating 8. With such a bond there is no likelihood of the protective coating 8 being stripped from the paper base strip during unwinding of the tape.

The coating 11 serves as an anchoring or sticking medium for holding the tape against any surface to which it is applied, and is preferably made in accordance with the following formula:

| | Parts by weight |
|---|---|
| Rubber | 36.0 |
| Zinc oxide | 26.0 |
| Adhesive resins and softeners | 28.0 |
| Fillers | 10.0 |

The adhesive coating is preferably applied by a calendering machine after vulcanization of the coating 8 and during application becomes bonded to the inner face of the paper base strip. The portion of the rubber filling 10 which is on the inner face of the base strip serves to augment the normal or natural bond between the pressure sensitive coating 11 and the strip. By reason of the fact that the adhesive coating 11 is permanently tacky and pressure sensitive the tape may be applied to any surface by way of pressure and readily removed and used again, if so desired.

The herein described tape due to the specific paper material of which the base strip 7 is formed, is capable of stretching to a comparatively great extent, as hereinbefore mentioned, and is especially adapted for masking purposes. It is resistant to lacquer, paints, enamels, organic solvents, and like materials, because it includes the vulcanized rubber protective coating 8. The cost of producing the tape is comparatively low by reason of the fact that the method of manufacture includes but five main steps, namely: (1) application of the rubber protective coating 8 to the outer face of the base strip; (2) application of the ethyl cellulose coat 9 to the outermost coat of the protective coating 8; (3) impregnation or saturation of the paper base strip 7 with rubber latex; (4) vulcanization of the rubber protective coating 8 and the filling 10; and (5) application to the inner face of the latex saturated or impregnated paper base strip 7 of the coating 11 of permanently tacky pressure sensitive rubber base adhesive.

The invention is not to be understood as being restricted to the specific details set forth, since these may be modified within the scope of the appended claims without departing from the spirit and scope of the invention.

Having thus described the invention, what I claim as new and desire to secure by Letters Patent is:

1. As a new article of manufacture, a tape adapted to be wound in roll form and comprising an elongated strip of flexible material, a coextensive coating of permanently tacky pressure sensitive adhesive on one face of the strip, and a separator coat formed for the most part of ethyl cellulose and extending over the other face of the strip.

2. As a new article of manufacture, a tape adapted to be wound in roll form and comprising a flexible strip of fibrous material, a vulcanized rubber protective coating covering one face of the strip and adapted to render the latter impervious to finishing materials, oils, organic solvents, and the like, a coextensive coating of permanently tacky pressure sensitive adhesive on the other face of the strip, and a separator coat formed for the most part of ethyl cellulose and extending over and bonded to the outer face of the vulcanized rubber coating.

3. As a new article of manufacture, a tape adapted to be wound in roll form and comprising a flexible strip of fibrous material, a vulcanized rubber protective coating covering one face of the strip and adapted to render the latter impervious to finishing materials, oils, organic solvents, and the like, a coextensive coating of permanently tacky pressure sensitive rubber base adhesive on the other face of the strip, and a separator coat formed of ethyl-cellulose and a small amount of resin and extending over and bonded to the outer face of the vulcanized rubber coating.

4. As a new article of manufacture, a tape adapted to be wound in roll form and comprising a flexible strip of porous fibrous material impregnated throughout with rubber, a coextensive coating of pressure sensitive rubber base adhesive on one face of the strip, and a separator coat formed for the most part of an ethyl cellulose and extending over and bonded to the other face of the strip.

5. As a new article of manufacture, a tape adapted to be wound in roll form and comprising a strip of porous fibrous material impregnated throughout with rubber latex, a vulcanized rubber protective coating covering, and bonded by the rubber latex to, one face of the strip and adapted to render the strip impervious to finishing materials, oils, organic solvents, and the like, a coextensive coating of permanently tacky pressure sensitive rubber base adhesive on the other face of the strip, and a separator coat formed for the most part of ethyl cellulose and extending over and bonded to the outer face of the vulcanized rubber coating.

6. As a new article of manufacture, a tape adapted to be wound in roll form and comprising a flexible strip of porous fibrous material having a substantially complete impregnation of cured rubber latex, a vulcanized rubber protective coating covering, and bonded by the rubber latex to, one face of the strip and adapted to render the strip impervious to finishing materials, oils, organic solvents, and the like, a coextensive coating of permanently tacky pressure sensitive rubber base adhesive on the other face of the strip, and a separator coat formed of ethyl-cellulose and resin and extending over and bonded to the outer face of the vulcanized rubber coating.

PAUL VAN CLEEF.